United States Patent [19]
Johansson et al.

[11] 3,800,684
[45] Apr. 2, 1974

[54] CONTROL DEVICE FOR AN EXPOSURE METER FOR PHOTOGRAPHIC CAMERAS

[75] Inventors: Lennart Ragnar Johansson, Landvetter; Lave Tenne, Norrbyvallda, both of Sweden

[73] Assignee: Fritz Victor Hasselblad, Goteborg, Sweden

[22] Filed: Feb. 24, 1972

[21] Appl. No.: 229,149

[30] Foreign Application Priority Data
Apr. 2, 1971 Switzerland.......................... 4295

[52] U.S. Cl................ 95/10 C, 95/10 FS, 95/31 FS
[51] Int. Cl......................... G01j 1/00, G03b 19/04
[58] Field of Search............. 95/10 C, 10 FS, 31 FS

[56] References Cited
UNITED STATES PATENTS
3,601,024   8/1971   Pagel................................. 95/31 FS
3,481,259   12/1969   Langnau et al.................... 95/31 FS

*Primary Examiner*—Samuel S. Matthews
*Assistant Examiner*—Russell E. Adams, Jr.
*Attorney, Agent, or Firm*—George Vande Sande

[57] ABSTRACT

This invention relates to photographic cameras provided with a through-the-lens exposure meter adapted for both automatic and manual measurement, in which a differential means in the exposure meter is actuated by a rotational movement, and a rheostat in the exposure meter is set for a resistance value proportional to the total of the correction values of two exposure factors. The invention, more precisely, relates to a control device for actuation of the exposure meter, combined with means, which upon manual measurement simulate the angle of rotation for adjusting the rheostat, which angle upon automatic measurement is adjusted by the mechanical differential included in the exposure meter. The control device is designed as a so-called control box, which is mounted on the camera exterior and is provided with a control key for actuating the exposure meter and with two knobs having setting scales with indexes for automatic measurement and, respectively, for occurring values of the two exposure factors, the latter used in manual measurement.

6 Claims, 1 Drawing Figure

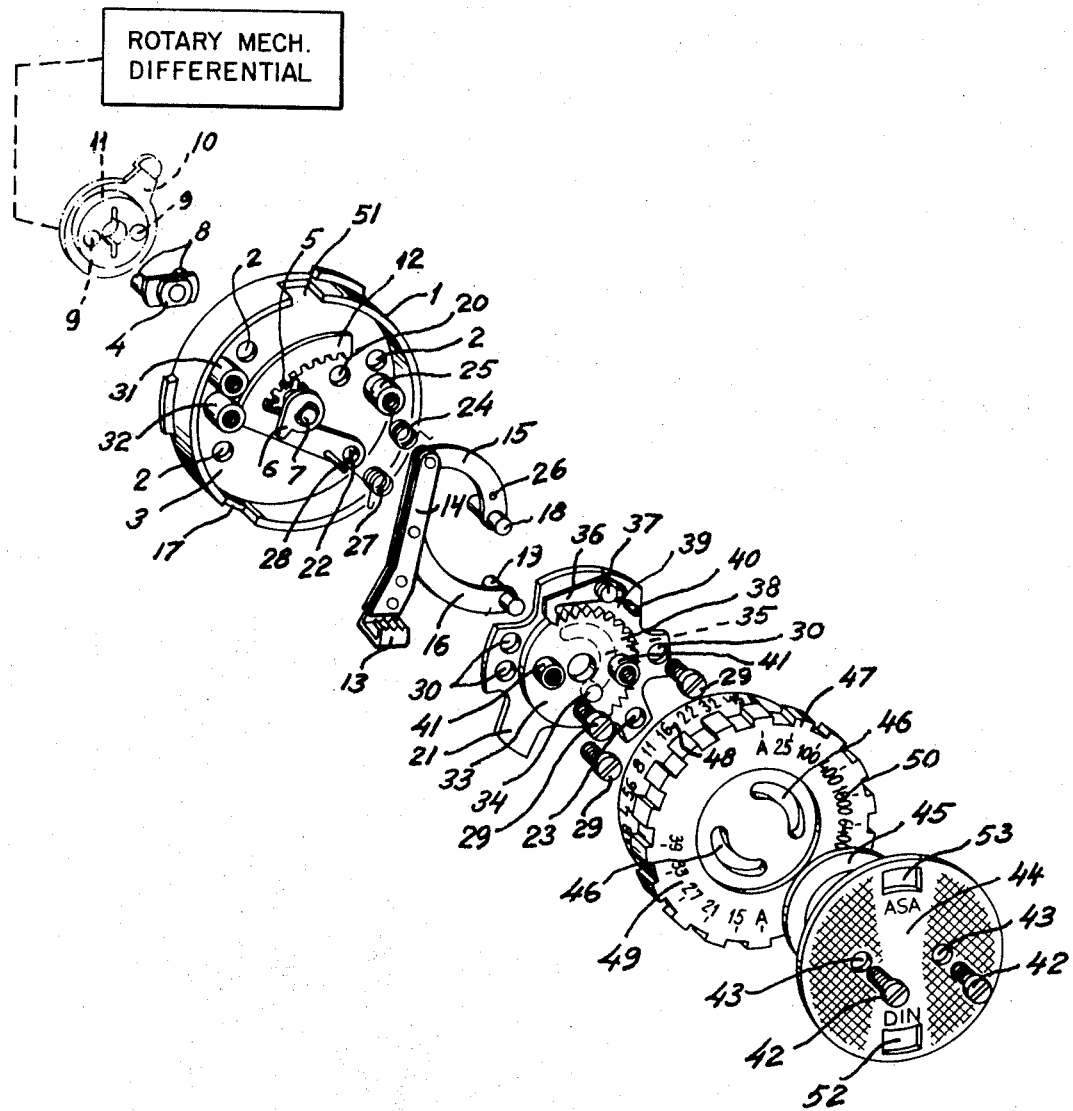

3,800,684

CONTROL DEVICE FOR AN EXPOSURE METER FOR PHOTOGRAPHIC CAMERAS

BACKGROUND OF THE INVENTION

The subject matter of this application is related to that of our application Ser. No. 227,534 filed Feb. 24, 1972.

It is known in automatic exposure meters to compare, at the time of measurement, the resistance of the light-sensitive device of the meter, for example a photoresistor, with the resistance of a variable resistor, for example a rheostat with carbon path.

The value of the variable resistor is to be proportional to the exposure factors, i.e. aperture size, shutter speed and film speed. In setting the variable resistor, it is known to sum the correction values for two of the exposure factors in a mechanical differential, which, for example, controls the sliding contact in a rheostat. The correction value for the third of the exposure factors, which is not concerned by the present invention, is supplied to the exposure meter, for example, by angular adjustment of the resistance path of the rheostat. It is further known to supply a differential with information on the size of the correction values by means of adjustable stop members, for example in the form of guide curves arranged in connection with the setting means of the respective exposure factors. The stop members are sensed by the inputs of the differential which, for example, are designed as axially movable rods.

Exposure meters constructed upon the principles described above presuppose the inputs of the differential to have two adjustable stop members for sensing so that automatic exposure measurement can take place. One or both of said stop members being absent, the automatic measurement does not work. This is the case, for example, when interchangeable lenses have a guide curve for the aperture size, but with this guide curve becoming unusable by reason of its removal from the associated input of the differential when additional bellows or intermediate rings are interposed between the camera body and the lens. The same problem occurs when interchangeable lenses of an older type are used and/or exchangeable film magazines having no control means. In such cases, the exposure measurement must be carried out manually, and the values in question are set individually on the camera setting means. This setting, however, is a tedious operation and requires a certain accuracy, thereby reducing the state of preparedness of the camera and involving the risk of failure due to negligence and hurry.

In a known differential of a later type constituting an exposure meter for both automatic and manual measurement, the construction has been modified to render the manual measurement simpler, quicker, and safer. Apparatus of this known type is disclosed in our above-mentioned copending application Ser. No. 227,534. This differential, which also performs a rotational movement proportional to the total of the two correction values, such that the movement sets the rheostat at the time of automatic measurement, is provided with an automatically operating release device and a signal device. The release device is designed to be actuated by the differential inputs formed as movable rods, which resiliently project a short distance out of the camera box when the exposure meter is not actuated and the inputs have adjustable stop members for sensing. In this position, the differential is engaged and automatic exposure measurement can be carried out. When attaching on the camera box an interchangeable lens of older type and/or a film magazine not adapted for automatic measurement, these elements in question have no such hole for the rod projecting out of the camera box and, consequently, the rod, or alternatively both rods, are pressed into the camera box and thereby disengage the differential so that the rheostat can be set manually. The signal device is linked to the release device and shows in a window in the camera outside symbols for automatic and, respectively, manual exposure measurement, for example A and M, so that by a rapid glance one can make sure which measuring method is to be applied.

SUMMARY OF THE INVENTION

The control device according to the present invention is intended for use together with the aforedescribed type of differential with release mechanism and renders it possible to perform quick and safe exposure measurement both automatically and manually by means of well-concentrated and easily accessible control and setting members. The camera thereby is given improved preparedness, especially in manual exposure measurement.

The control device is connected to the axle common to the differential and rheostat and is designed as a so-called control box mounted on the camera exterior and provided with a control key. Upon depression of the key at the time of measurement, the key movement is transformed into a rotary movement for the system comprising the control box, rheostat, and differential. At the time of automatic measurement, this rotary movement is stopped when the differential inputs contact the stop members for the correction values, which contact is established before the control key arrives at its bottom position. Therefore, a spring mechanism is provided for allowing the key to continue to its bottom position. When at the time of manual exposure measurement, the differential has been disengaged automatically, the rheostat is set by the control box, which is provided with an adjustable stop member limiting the angle of rotation. The setting position of said stop member is determined by the positions set on the two knobs with associated scales on the control box, by which the values of the exposure factors concerned at manual measurement are supplied to the exposure meter.

The procedure at the time of exposure measurement is as follows. When the signal in the window in the camera outside shows A for automatic measurement, the two setting members of the control box also are to be in their setting position A, which is their normal position as the automatic measuring method is possible in the majority of cases. In these cases, no readjustment is required, but only a quick control for making sure that the symbol A is visible in the aforementioned three well-concentrated and easily readable places, whereafter the control key is pressed to its bottom position for setting the rheostat of the differential. If the signal in the window in the camera outside shows M for manual measurement, the two setting members of the control box are to be set to the values for the respective exposure factors concerned at the photographing occasion. Thereafter, the control key is pressed to its bottom position for setting the rheostat by the mechanism within the control box which simulates the work of the differential. As appears from the aforesaid, the exposure measurement in a camera equipped with a control box according to the invention is very simple, quick, and safe both for automatic and manual measurement. This applies also to changing between said two measuring methods.

BRIEF DESCRIPTION OF THE DRAWING

A preferred embodiment of the invention, intended for a camera having interchangeable lenses and exchangeable film magazines with adjustable stop members, which are sensed by the differential inputs with respect to preset aperture size and film speed applied, is described in greater detail in the following, with reference to the accompanying drawing showing a perspective view of a spread-apart control box with connecting sliding contact.

DETAILED DESCRIPTION OF THE PREFERRED EMBODIMENT

On the outside of a camera (not shown) provided with an exposure meter of the type described above and as shown and described in the above-mentioned application Ser. No. 227,534, a control device according to the present invention, a so-called control box, is secured. Said control box is situated so that its axis of rotation coincides with the axis of an axle associated with the differential for actuating the exposure meter. The housing of the control box 1 is mounted on the camera by screws (not shown) through holes 2 in the bottom 3 of housing 1. In the center of housing 1 a unit is supported which comprises a coupling-half 4, a cogwheel 5, and a stop member 6. These elements are fastened on an axle 7 common to said elements. The coupling-half 4 is provided with pins 8 fitted into holes 9 provided in a sliding contact 10, which is formed as a second coupling-half and associated with the variable resistor of the exposure meter. The sliding contact 10 includes a central hole 11 with keyways which encloses an axle journal (not shown) provided with a follower pin, by which journal the differential of the exposure meter is rotated upon exposure measurement. The axle journal of the differential, the sliding contact 10 and the unit 4, 5, 6, 7 thereby form a rigid system rotatable about said common center line. Each angular position assumed by the system, therefore, has corresponding thereto a constant resistance value specific for the angular position, which value in its turn is dependent upon the total of the correction values of the two exposure factors, irrespective of whether the values are summed up in the differential or simulated by means of the control box in the manner described below.

The cogwheel 5 meshes with an internal tooth sector 12, which is operated by a linkage connected with a control key 13 and comprising a central link 14, an outer link 15, and an inner link 16. The control key 13 is riveted on the free portion of the central link 14 which projects outwards through a lateral recess 17 in the housing 1. The links 15, 16 are supported pivotally in the central link 14 and provided at their free ends with fixed through pins 18 and, respectively, 19. The pin 18 is supported, on the camera side, in a hole 20 in housing 1 and, on the opposed side, in a hole (concealed) in a shield 21. The pin 19 is supported, on the camera side, in a hole (concealed) in housing 1 and also constitutes the bearing journal for the toothed sector 12 through a hole 22. On the opposed side, the pin 19 is supported in a hole 23 in the shield 21. A return spring 24 mounted on pin 18 has its one end fastened about a fixed nut 25 on the bottom 3 of housing 1 and its other end is held in a hole 26 in the link 15. A release spring 27 mounted on pin 19 has its one end fastened about a pin 28 on the tooth-sector 12 and its other end abuts the link 16.

The shield 21 is secured by three screws 29 extending through holes 30 to the fixed nut 25 and an additional two nuts 31, 32 on the bottom 3 of housing 1. A ratchet wheel 33 is disposed on the surface of shield 21 remote from the camera and supported rotatably on a hub (not shown) on shield 21 which also is the support for the axle 7. The angle of rotation for the ratchet wheel 33 is limited by a stop pin 34 co-acting with an arc-shaped groove 35 in the shield 21. A catch 36 for a snap-type locking means is supported on an axle 37 located on shield 21 and is pressed against a toothed portion 38 on the ratchet wheel 33 by a click-spring 39 extending about the axle 37 and having its fastening points in the catch 36 and, respectively, in a pin 40 on the shield 21. On the ratchet wheel 33 two fixed nuts 41 are so arranged that their associated screws 42, seen from the outside, extend through holes 43 in a setting disc 44, past a friction disc 45 and through arc-shaped holes 46 in a scale-wheel 47.

The scale-wheel 47 is of limited rotatability, in that the screws 42 extend through the two arc-shaped holes 46, the central angle of which corresponds to the range of an aperture scale 48 on the outer surface of the scale wheel 47 and, respectively, film speed scales 49, 50 in DIN and, respectively, ASA values on the end surface of scale wheel 47. The aperture scale 48 is read through a window 51 in housing 1, and the film speed scales 49, 50 are read through windows 52 and, respectively, 53 on the setting disc 44. The aperture scale 48 includes the preset aperture sizes occurring in the series of interchangeable lenses of the camera plus a position A beyond the aperture size of highest number, i.e. the smallest aperture, which position is intended for automatic exposure measurement. For the same purpose, an A-position is arranged beyond the lowest film speed value on the scales 49 and 50, respectively. The friction disc 45 maintains friction between the scale wheel 47 and setting disc 44 sufficient to prevent unintentional angular displacement between said wheel and said disc.

In automatic exposure measurement, in accordance with the aforesaid, the signal device controlled by the differential of the exposure meter shows the symbol A in the window in the camera exterior, thereby indicating that both inputs of the differential have adjustable stop members for sensing the correction values, i.e. in this case the preset aperture size and, respectively, the film speed applied. The differential thereby is engaged for setting the variable resistor in the measuring circuit, which, in the embodiment chosen, means setting of the sliding contact 10. In automatic exposure measurement, the setting disc 44 and scale wheel 47 are to be set such that the symbol A on the aperture scale 48 and on the film speed scales 49, 50 is visible in the corresponding windows 51, 52, and 53 respectively. Upon depression of the control key 13 at the time of exposure measurement, the unit 4, 5, 6, 7 is forced by the linkage 14, 15, 16 to rotate counterclockwise, as the strong release spring 27 turns the toothed sector 12. At the same time, the sliding contact 10, and the axle for actuating the differential, rotate until the inputs of the differential establish contact with their stop members as disclosed in the aforementioned application Ser. No. 227,534, whereafter rotation of the differential, sliding contact 10 and of the unit 4, 5, 6, 7 rigidly connected therewith in the control box cannot continue. The sliding contact 10 thereby has arrived at the resistance value which corresponds to the resulting correction value for preset aperture size and the film speed then applied.

The movement in the differential having been stopped, which takes place before the control key 13 arrives at its bottom position, the release spring 27 permits pressing the control key 13 to its bottom position. Upon release of the control key 13, the return spring 24 returns the device to its starting position. The setting of a suitable combination of aperture size and shutter speed is effected by associated setting members on the camera when the control key 13 is in a depressed state, whereby the indicating means of the exposure meter are utilized for control.

At the time of manual exposure measurement, in accordance with the aforesaid, the signal device shows the symbol M in the window in the camera exterior and thereby indicates that the inputs of the differential do not have one or both of the adjustable stop members for sensing. This implies that the differential is disengaged and manual measurement is necessary. In this position, the control box is allowed to simulate the work of the differential and to set the sliding contact 10. The film speed value in question is set by the setting disc 44 in one of the windows 52 or 53, and the preset aperture size is set with the scale wheel 47 in the window 51. As a result, the stop pin 34 is so oriented in relation to the stop member 6, that the coupling-half 4, upon depression of control key 13 in the aforedescribed way, turns the sliding contact 10 to correct angle position. In other words, the setting position of the ratchet wheel 33, which is set by means of scales 48, 49, or 50, respectively, determines the angle of rotation of the sliding contact 10. The axle of rotation of the differential, which is disengaged, does not obstruct the movement of the sliding contact at the time of manual measurement. Upon release of the control key 13, the device returns to its starting position in the same manner as at automatic exposure measurement. When the camera is provided with focal-plane shutter, the speed ring of the camera can be used directly as a balancing means in the setting of the exposure meter. When, however, the camera is equipped a between-lens shutter, the value is to be transferred manually from the speed ring of the camera to that of the lens. The indicating means of the exposure meter alternatively may be balanced by turning the wheel 47 to thereby vary the aperture size.

The embodiment of the invention described above and shown in the drawing can be varied substantially without departing from the basic idea of the invention. The invention, for example, can be applied to any optional pair of the three exposure factors comprising aperture size, shutter speed, and film speed to suit the individual camera construction. The choice as to which of the two exposure factors is to be controlled by the setting disc 44 and, respectively, scale wheel 47 is also optional. The variable resistor, furthermore, may have a different design and may, for example, be straight with the setting rotational movement being transformed into a rectilinear movement by some means known per se, for example cogwheels and rack.

We claim:

1. In a through-the-lens exposure control system for a camera, the combination comprising: means for controling the exposure of film in the camera,
   a rotary mechanical differential for responsive to Indicia indicative of a plurality of exposure factors, said means for controlling having a circuit including a component setable in accordance with said exposure factors,
   a control device operatively connectable to said differential for setting controling means,
   control means for selectively manually actuating said control device to a first condition corresponding to automatic operation of said exposure meter in which condition said differential is operatively connected to said control device for setting said component in accordance with said indicia,
   said control means being also effective to selectively manually actuate said control device to a second condition corresponding to manual operation of said exposure controling means, where said differential is disengaged from said indicia, and manually operable input means governed in accordance with a predetermined plurality of manually applied exposure factors and effective on said control device in its said second condition to set said variable circuit parameter to a particular value representative of the combination of said manually set exposure factor manifestations.

2. The improvement of claim 1 wherein said control device comprises a housing secured to the exterior of the camera case, said device comprising rotary means having an axle operatively coupled to the axle of the rotary differential.

3. The improvement of claim 1 which further includes a manually operable control key projecting outwardly of said housing, linkage means operatively coupled with said control key, a toothed sector element, an axle operatively connected to the rotary mechanical differential, a cogwheel supported on said axle and meshing with said toothed sector, spring means responsive to said linkage means for rotating said axle through said toothed sector and said cogwheel as said control key is actuated to thereby operate said differential.

4. The improvement of claim 3 which further includes an adjustable stop means mounted on said axle and constituting a fixed stop member, and an adjustable stop pin operable to a first position when said control device is in its said first condition to permit operation of said differential through its entire operating range in response to actuation of said control key and only as limited by the inputs to said differential, said control device when in its said second condition operating said adjustable stop pin to a particular position in a predetermined range of its movement as selected by said manually set exposure factors manifestations, said adjustable stop pin in its said particular position limiting movement of said fixed stop to a corresponding predetermined position as said axle is rotated in response to actuation of said control key to thereby set said component in accordance with said manually set exposure factors.

5. The improvement of claim 4 wherein said control means comprises two independently rotatable setting members having associated scales for setting said adjustable stop pin.

6. The improvement of claim 4 wherein said stop pin is mounted on a ratchet wheel having a toothed position engaging a resilient catch means, said device further including a shield member defining a groove which slidably receives said stop pin, said groove limiting the extent of movement of the stop pin to a value corresponding to the measuring range of the exposure meter.

* * * * *

PO-1050
(5/69)

UNITED STATES PATENT OFFICE
CERTIFICATE OF CORRECTION

Patent No. 3,800,684             Dated April 2, 1974

Inventor(s) LENNART RAGNAR JOHANSSON and LAVE TENNE

It is certified that error appears in the above-identified patent and that said Letters Patent are hereby corrected as shown below:

The foreign application priority data shown as follows:

Apr. 2, 1971     Switzerland ............... 4295 should be

April 2, 1971   Sweden. . . . . . . . . . .4295/71

Signed and sealed this 17th day of September 1974.

(SEAL)
Attest:

McCOY M. GIBSON JR.             C. MARSHALL DANN
Attesting Officer               Commissioner of Patents